United States Patent [19]  [11] 3,886,208
Akerblom  [45] May 27, 1975

[54] N-ALKYLATION OF ACYLATED AMINO COMPOUNDS
[75] Inventor: Eva Birgitta Akerblom, Uppsala, Sweden
[73] Assignee: Pharmacia Aktiebolag, Uppsala, Sweden
[22] Filed: Dec. 15, 1972
[21] Appl. No.: 315,691

Related U.S. Application Data
[63] Continuation of Ser. No. 98,855, Dec. 16, 1970, abandoned.

[30] Foreign Application Priority Data
Dec. 23, 1969 Sweden.............................. 17859/69

[52] U.S. Cl.......... 260/518 R; 260/518 A; 260/519; 260/562 R; 260/576; 260/577; 260/558 R
[51] Int. Cl.......................................... C07c 101/54
[58] Field of Search............ 260/518 R, 576, 562 R, 260/518 A, 577, 519

[56] References Cited
OTHER PUBLICATIONS
Finar, I. L.; Organic Chemistry, Vol. I, pub. by Richard Clay & Co., Great Britain, (1963) – QD251F56; page 196 cited.

Primary Examiner—Lorraine A. Weinberger
Assistant Examiner—L. A. Thaxton
Attorney, Agent, or Firm—Fred Philpitt

[57] ABSTRACT
In the N-alkylation of a compound of the formula

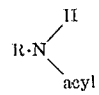

wherein R is an organic residue and "acyl" is an acyl group, by reaction with an alkylating agent of the formula X. alkyl wherein X is a reactive group or atom which during the alkylating process can be split off together with the hydrogen atom at the nitrogen atom, and "alkyl" is an alkyl group, the improvement comprising carrying out the reaction in the presence of one or more compounds of the formula

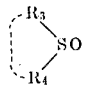

wherein $R_3$ and $R_4$ each represent a lower alkyl group having at most 5 carbon atoms, or $R_3$ and $R_4$ together with the sulphur atom represent a saturated heterocyclic ring system, under alkaline conditions.

7 Claims, No Drawings

N-ALKYLATION OF ACYLATED AMINO COMPOUNDS

This is a continuation of application Ser. No. 98,855, filed Dec. 16, 1970, now abandoned.

The present invention relates to an improvement in the N-alkylation of acrylated amino compounds of the formula I

(I)

wherein R is an organic residue and "acyl" is an acyl group, by reaction with an alkylating agent of the formula II X. alkyl   (II)

wherein X is a reactive group or atom which during the alkylating process can be split off together with the hydrogen atom at the nitrogen atom, and "alkyl" is an alkyl group, to form a compound of the formula III

(III)

wherein R' is the same organic residue as R or an alkylated residue R, and "alkyl" and "acyl" both have the significance given above.

Processes for alkylating amines are known to the art (see Hickinbottom: Reactions of oganic compounds, published by Longmans, Green and Co., London, New york, Toronto 1963, page 408 ff). These processes, however, have the disadvantage of not being selective, while the end products obtained are a mixture of mono and dialkylated amines and not alkylated amines. Attempts have been made to N-alkylate acylated amines, in order to circumvent these disadvantages. These attempts, however, have necessitated the application of drastic reaction conditions, such as the use of very strong bases and very high reaction temperatures for example, which is naturally disadvantageous technically. Furthermore, yield reducing secondary reactions are liable to take place, leading to contamination of the end product. It has now surprisingly been found that these and other disaddvantages can be eliminated or considerably reduced if the reaction is carried out in the presence of a compound of the formula IV

(IV)

wherein $R_3$ and $R_4$ each represent a lower alkyl group having at most 5 carbon atoms, or $R_3$ and $R_4$ together with the sulphur atom represent a saturated heterocyclic ring system under alkaline conditions, and the obtained compound of formula III optionally is deacylated to a compound of the formula

wherein R' and "alkyl" both have the above significance.

The compound to be N-alkylated may suitably be dissolved or suspended in a compound of formula IV and a substance which will promote alkaline conditions, e.g., an alkali metal hydroxide, such as sodium or potassium hydroxide, whereupon the alkylating agent is added to the obtained solution or dispersion.

Examples of compounds of formula IV are dimethyl sulphoxide, methylethyl sulphoxide, diethyl sulphoxide and sulpholane. Thus, dimethyl sulphoxide is used advantageously. The compound of formula IV can be used in pure form but it can also be diluted with a liquid, in which the compound of formula IV is soluble. Thus, in some instances the compound of formula IV can be diluted with water.

The reaction according to the present invention can be carried out at temperatures considerably lower than with prior, similar alkylating reactions. Thus, it can be carried out to advantage at room temperature with very good yields.

Alkylations of the type described are very important within the chemical industry, including the pharmaceutical industry, for example when producing compounds active on the nervous system (psycho pharmacological preparations).

Another important example is the preparation of the compound of the formula

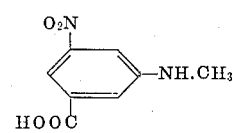

which can be used as an intermediate in the preparation of X-ray constrast agents. This compound can be acetylated to the compound of the formula

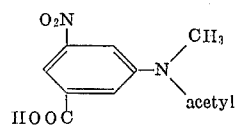

which by reduction can be converted to a compound of the formula

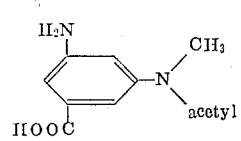

which in turn can be triiodinized and acetylated to a valuable X-ray contrasting agent or starting material for X-ray constrasting agents (U.S. Pat. Application Ser. No. 51,330) ).

In formula I the acyl group is a carboxylic acid residue. The following acyl groups are examples of such groups in the compound of formula I: formyl, acetyl, propionyl, and other alkanoyl groups, which can be unsubstituted or substituted. A valuable example of the acyl group is the benzoyl group.

Dialkyl sulphates, such as dimethyl sulphate and diethyl sulphate are examples of the compounds which can be used to advantage as the alkylating agent of formula II. In the compound of formula II the alkyl group is often a lower alkyl group having 1 to 5 carbon atoms. The alkyl group is in many cases methyl or ethyl and dimethyl sulphate and diethyl sulphate are preferably used as alkylating agent in these cases.

The organic residue of formula R may naturally be of a varying nature, such as alkyl, aryl, aralkyl, which may optionally be substituted with other atoms or groups. Thus, if the organic residue is aryl or aralkyl it may, for example, contain one or more benzene rings, which may be substituted with one or more atoms or groups. Thus, multi-ring systems may also be present in said aryl or aralkyl groups.

It is conceivable that the organic residue R contains one or more groups which can be alkylated under the reaction conditions and is therefore also alkylated. If it is not desired to alkylate these groups, they can be protected by substitution, for example, with a group which can be readily removed after the reaction.

In the event that it is desired after the reaction to remove the acyl residue from the compound formed during the reaction, this can be done by hydrolysis under alkaline conditions, e.g., by adding water to the reaction mixture and possibly raising the reaction temperature. In this way secondary amines are obtained which are not contaminated with primary or tertiary amines, which, as the man skilled in the art will readily appreciate, is to particular advantage. In certain instances splitting of the acyl group can be effected to advantage, directly in connection with the alkylating reaction.

The invention will now be illustrated by means of a number of examples.

EXAMPLE 1 a. N-methyl acetanilide 13.5 g (0.1 mol) of acetanilide were dissolved in 70 ml of dimethyl sulphoxide, to which were then added 28 g (0.5 mol) of pulverized potassium hydroxide. 21 ml (0.22 mol) of dimethyl sulphate were added dropwise over 1 hour with stirring, the temperature being maintained at 20° − +°C. The reaction mixture was stirred for a further hour and then diluted with 200 ml of water. This solution was extracted four times with chloroform. The chloroform phase was then dried and evaporated. The residue was washed with petroleum ether and 12.7 g (85 %) of N-methylacetanilide was obtained. Melting point 89° − 94°C. It was established by thin-layer chromatography (benzene-methanol 75:25) that the product contained no non-methylated products.

The product is identified with mass spectrum and IR-spectrum.

b. N-methylaniline 13.5 g (0.1 mol) of acetanilide were dissolved in 50 ml of dimethyl sulphoxide, whereafter 28 g (0.5 mol) of pulverized potassium hydroxide were added. 21 ml (0.22 mol) of dimethyl sulphate were then added dropwise over the course of two hours with stirring, the temperature being maintained at 20° − 30°C. After a further hour, 10 ml of water were added and the reaction mixture heated for 1.5 hours at 80°C for deacetylating purposes. 190 ml of water were then added and the mixture shaken with ether three times. The ether phase was washed three times with water and then distilled. The main fraction at 73.5°C/10 mm. 9.4 g (88 %) of N-methylaniline were obtained.

The product is identified with mass spectrum and IR-spectrum.

EXAMPLE 2

3-methylamino-5-nitrobenzoic acid 13.2 g (0.06 mol) of 3-acetylamino-5-nitrobenzoic acid were dissolved in 50 ml of dimethyl sulphoxide, whereafter 16.8 g (0.3 mol) of pulverized potassium hydroxide were added under cooling. 12.8 ml (0.135 mol) of dimethyl sulphate were then added dropwise with stirring over the course of one hour, the temperature being maintained at 20° − 30°C, whereafter the dark red coloured reaction solution was stirred for a further hour, at room temperature. The reaction solution was then diluted with 400 ml of water and an orange coloured product precipitated out. This product dissolved gradually and the pH of the solution was adjusted to 1.5, whereupon 10.4 g (88.5 %) of 3-methylamino-5-nitrobenzoic acid precipitated out. Melting point 202° − 204.5° C. It was established by thin-layer chromatography (benzenemethanol 75:25) that the product contained no non-methylated products.

| Analysis | C | H | N |
|---|---|---|---|
| Calculated | 49.0 | 4.1 | 14.3 |
| Obtained | 49.2 | 4.1 | 14.3 |

EXAMPLE 3

N-methyl-N-benzylacetamide 12.5 g (0.084 mol) of N-benzylacetamide were dissolved in 60 ml of dimethyl sulphoxide, whereafter 21 g (0.38 mol) of pulverized potassium hydroxide were added. 20 ml (0.21 mol) of dimethyl sulphate were then added dropwise over a course of two hours with stirring at 20° − 30°C and the reaction mixture stirred for a further 1.5 hours. The solution was then diluted with 200 ml of water and extracted four times with chloroform. The chloroform phase was dried and distilled. The main fraction distilled at 140° − 143°C/10 mm. 12.9 g (94 %) of N-methyl-N-benzylacetamide were obtained.

It was established by gas chromatography that the product contained no non-methylated products.

The product is identified with mass spectrum and IR-spectrum.

The obtained compound can be deacetylated in an alkaline environment by conventional methods.

EXAMPLE 4

N-ethyl-N-benzylacetamide 12.5 g (0.084 mol) of N-benzylacetamide were dissolved in 50 ml of dimethyl sulphoxide. 21 g (0.37 mol) of pulverized potassium hydroxide were then added, whereafter 26,6 ml (0.203 mol) of diethyl sulphate were added dropwise over the the course of two hours with stirring. The temperature was maintained at 20° −

30°C and the synthesis stirred at room temperature over night. 200 ml of water were then added and the reaction mixture shaken with ether three times. The ether was dried and distilled. The main fraction distills at 143° – 149°C/10 mm. 12.6 g (85 %) of N-ethyl-N-benzyl-acetamide were obtained.

The product is identified with mass spectrum and IR-spectrum.

The obtained compound can be deacylated in an alkaline environment by conventional methods.

EXAMPLE 5

5-(N-methyl-3-acetamidopropylidene)-10,11-dihydro-5H-dibenzo-cycloheptane 8 g (0.0275 mol) of 5-(3-acetamidopropylidene)-10,11-dihydro-5H-dibenzo-cycloheptane were dissolved in 50 ml of dimethylsulphoxide, whereafter 7.7 g (0.137 mol) of pulverized potassium hydroxide were added. 5.25 ml (0.055 mol) of dimethyl sulphate were then added dropwise over the course of two hours with stirring at 20° – 30°C and the synthesis completed over a further three hours at room temperature. 150 ml of water were then added and an oil precipitated out. The reaction mixture was shaken three times with ether. The ether was washed with water, dried and evaporated. 7.53 g (94 %) of 5-(N-methyl-3-acetamidopropylidene)-10,11-dihydro-5H-dibenzo-cycloheptane were obtained.

The product is identified by IR-spectrum.

The obtained compound can in conventional manner be deacetylated in an alkaline environment to obtain the compound

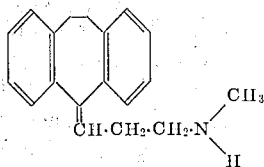

which is a valuable medicament.

EXAMPLE 6

3-methylamino-5-nitrobenzoic acid 450 g (2 moles) of 3-acetylamino-5-nitrobenzoic acid were dissolved in 1,330 ml of dimethyl sulphoxide, whereafter a solution of 800 g (20 moles) sodium hydroxide in 900 ml of water were added under cooling. 430 ml (4.45 moles) of dimethyl sulphate were added dropwise with stirring over the course of two and a half hours, the temperature being maintained at 20° – 30°C, whereafter the reaction mixture was stirred for twenty hours. An orange coloured product precipitated out and was collected by filtration. This product was treated with 9 L of water and the pH of the solution was adjusted to 1.5 whereupon 354 g (91 %) of 3-methylamino-5-nitrobenzoic acid precipitated out. Melting point 198° – 203°C.

EXAMPLE 7 a. 2'-benzoyl-4'-chloroformanilide 115.8 g (0.5 mole) of 2-amino-5-chlorobenzophenone were dissolved in 100 ml of formic acid (98 – 100 %) and the solution was refluxed for 3 hours. This solution was poured into 500 ml of water upon which crystals precipitated. These were filtered off and recrystallized from methanol. Melting point 88° – 90°C.

b. 5-chloro-2-methylamino benzophenone 26 g (0.1 mole) of 2'-benzoyl-4'-chloroformanilide were dissolved in 100 ml of dimethyl sulphoxide whereafter 28 g (0.5 mole) of pulverized potassium hydroxide were added. 21 ml (0.22 mole) of dimethyl sulphate were added dropwise over the course of two hours with stirring the temperature being maintained at 20° – 30°C. After additional stirring for a while at this temperature the reaction mixture was poured into 500 ml of water upon which crystals precipitated out. These were filtered off and dried. Melting point 93° – 95°C. Yield 23.5 g (95.5 %). The product was identified with NMR.

The product may be recrystallized from methanol.

EXAMPLE 8 a. 2'-benzoyl-4'-chlorobenzanilide 115.8 g (0.5 mole) of 2-amino-5-chlorobenzophenone were dissolved in 250 ml of pyridine and 71 g (0.5 mole) of benzoyl chloride were added dropwise over the course of five minutes, at which the temperature rose to about 80°C. The solution was refluxed for 30 minutes, whereafter it was poured into a mixture of 300 ml of conc. hydrochloric acid and ice. Crystals precipitated out and was filtered off and recrystallized from 99 % ethanol. Melting point 104° – 106°C.

b. 5-chloro-2-methylaminobenzophenone 33.6 g (0.1 mole) of 2'-benzoyl-4'-chlorobenzanilide were dissolved in 100 ml of dimethyl sulphoxide, whereafter 28 g (0.5 mole) of pulverized potassium hydroxide were added. 21 ml (0.22 mole) of dimethyl sulphate were added dropwise over the course of 1.5 hours while stirring at 20° – 30°C. After another hour the reaction mixture was poured into a water-ice mixture. This was extracted with methylene chloride, whereafter the methylene chloride was driven off in vacuum. The residue was dissolved in 100 ml of concentrated sulphuric acid and this solution was heated at 100°C for half an hour. After chilling the solution was poured into a water-ice mixture and made alkaline by adding ammonia. Crystals precipitated out and were filtered off and recrystallized from methanol. Melting point 93° – 95°C.

In a manner analogous to that of Examples 7 and 8 the following 2-amino benzophenones were reacted:

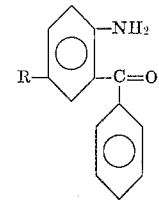

wherein R is bromo, fluoro, trifluoromethyl, nitro or methoxy, giving the appropriate methylamino benzophenones.

The excess of alkali and alkyl sulphates given in the Examples may be lowered to an essential extent, especially when working in a dialkyl sulphoxide with a low content of water.

What I claim is:

1. In the known process of the N-alkylation of acylated amino compounds of the formula

  (I)

wherein R represents a member selected from the group consisting of alkyl, aryl and aralkyl groups, said groups being unsubstituted and alkyl, aryl and aralkyl groups, said groups being substituted, and 'acyl' represents a member selected from the group consisting of alkanoyl and benzoyl, by reaction with di-(alkyl)sulfate having the formula alkyl . O . SO$_2$ . O . alkyl wherein 'alkyl' is an alkyl group containing from 1 to 5 carbon atoms, to form a compound of the formula III

  (III)

wherein R$^1$ represents a member selected from the group consisting of the same organic residue as R above, and alkylated R, and 'alkyl' and 'acyl' each have the same significance as above, the improvement which consists of bringing together the reactants with dimethylsulfoxide under alkaline reaction conditions and at a sufficient temperature to substitute the alkyl group of the alkylating agent for the hydrogen of the compound of the formula I.

2. A method as set forth in claim 1, in which the compound of formula III is subjected to hydrolysis in order to remove the acyl group.

3. A method according to claim 2 wherein the dialkyl sulphate is dimethyl sulphate or diethyl sulphate.

4. A method according to claim 1, wherein the alkylating agent of formula II

X . alkyl  (II)

is a dimethyl sulphate and the compound of formula IV

  (IV)

is dimethyl sulfoxide.

5. A method according to claim 1 wherein the acylated amino compound is a member selected from the group consisting of N-formyl and N-benzoyl derivatives of a 2-aminobenzophenone of the formula

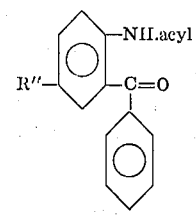

wherein R'' is a member selected from the group consisting of chloro, bromo, fluoro, trifluoromethyl, nitro and methoxy, and 'acyl' represents a member selected from the group consisting of alkanoyl and benzoyl.

6. A method according to claim 5 wherein the alkylating agent of the formula II X-alkyl is a dialkyl sulphate and each alkyl group contains from 1 to 5 carbon atoms.

7. A method according to claim 6 wherein the dialkyl sulphate is a member selected from the group consisting of dimethyl sulfate and diethyl sulphate.

* * * * *